United States Patent
Sakagami et al.

(10) Patent No.: US 7,880,130 B2
(45) Date of Patent: Feb. 1, 2011

(54) OPTICAL DEVICE AND MOBILE APPARATUS

(75) Inventors: Yoshiaki Sakagami, Wako (JP); Yoichi Nishimura, Wako (JP); Kenji Kadowaki, Kiyose (JP)

(73) Assignees: Honda Motor Co., Ltd., Tokyo (JP); Yuki Kougaku Co., Ltd., Tokyo (JP)

( * ) Notice: Subject to any disclaimer, the term of this patent is extended or adjusted under 35 U.S.C. 154(b) by 908 days.

(21) Appl. No.: 11/808,250

(22) Filed: Jun. 7, 2007

(65) Prior Publication Data

US 2007/0296950 A1  Dec. 27, 2007

(30) Foreign Application Priority Data

Jun. 7, 2006  (JP) ............... 2006-158934
Apr. 18, 2007  (JP) ............... 2007-108864

(51) Int. Cl.
*G03B 21/62* (2006.01)
*H01J 3/14* (2006.01)

(52) U.S. Cl. ............ 250/216; 250/221; 250/222.1

(58) Field of Classification Search ........... 250/216, 250/221, 222.1, 208.1; 359/619, 621, 622, 359/623, 624
See application file for complete search history.

(56) References Cited

U.S. PATENT DOCUMENTS

| | | | | |
|---|---|---|---|---|
| 4,419,574 | A * | 12/1983 | Kawabata et al. | 250/204 |
| 5,606,181 | A * | 2/1997 | Sakuma et al. | 257/88 |
| 6,021,003 | A * | 2/2000 | Katsuki et al. | 359/619 |
| 6,396,636 | B2 * | 5/2002 | Sawaki et al. | 359/624 |
| 6,683,675 | B2 | 1/2004 | Aoyama | |
| 7,321,112 | B2 * | 1/2008 | Stam et al. | 250/216 |
| 7,542,101 | B2 * | 6/2009 | Kume et al. | 349/5 |
| 7,619,824 | B2 * | 11/2009 | Poulsen | 359/621 |
| 7,718,943 | B2 * | 5/2010 | Johnson et al. | 250/208.1 |
| 2001/0030805 | A1 * | 10/2001 | Sawaki et al. | 359/453 |
| 2001/0033422 | A1 * | 10/2001 | Miura et al. | 359/621 |
| 2005/0128594 | A1 * | 6/2005 | Hanson et al. | 359/619 |
| 2005/0134965 | A1 * | 6/2005 | Poulsen | 359/619 |
| 2006/0169873 | A1 * | 8/2006 | Seyfried et al. | 250/208.1 |
| 2007/0296950 | A1 * | 12/2007 | Sakagami et al. | 356/4.01 |
| 2008/0043326 | A1 * | 2/2008 | Poulsen | 359/455 |

FOREIGN PATENT DOCUMENTS

| | | |
|---|---|---|
| DE | 4335244 | 6/1995 |
| DE | 10 2005 046989 A1 | 4/2006 |
| GB | 2 154 756 A | 9/1985 |
| JP | 2004-257935 | 9/2004 |

* cited by examiner

OTHER PUBLICATIONS

German Search Report, 10 2007 0260364.5, dated Mar. 17, 2008, with English translation.

*Primary Examiner*—John R Lee
(74) *Attorney, Agent, or Firm*—Squire, Sanders & Dempsey, LLP

(57) ABSTRACT

An optical device ensuring projection of light over a wide range as well as reduction in size, and a mobile apparatus mounted with the optical device are provided. The optical device (100) includes a light-projecting unit (110) and a light-receiving unit (120). The light-projecting unit (110) has a projector (114) and a lenticular sheet (112) arranged in layers. First and second cylindrical lens arrays having their generatrices orthogonal to each other are formed on the respective surfaces of the sheet (112). The light-receiving unit (120) has a light-receiver (124). The light-projecting unit (110) and the light-receiving unit (120) are arranged adjacent to each other in an integrated manner so that the light-receiver (124) can sense the light emitted from the projector (114) via the sheet (112) and then reflected from an object.

13 Claims, 10 Drawing Sheets

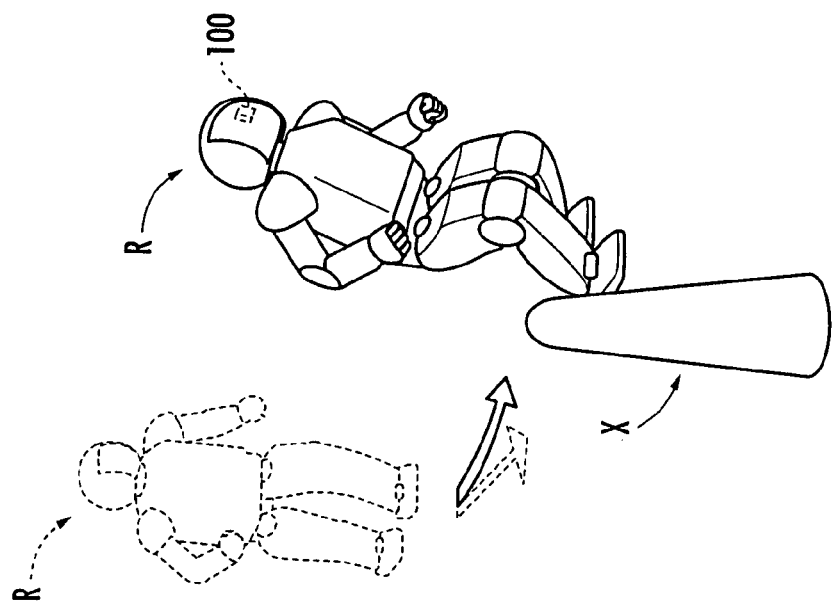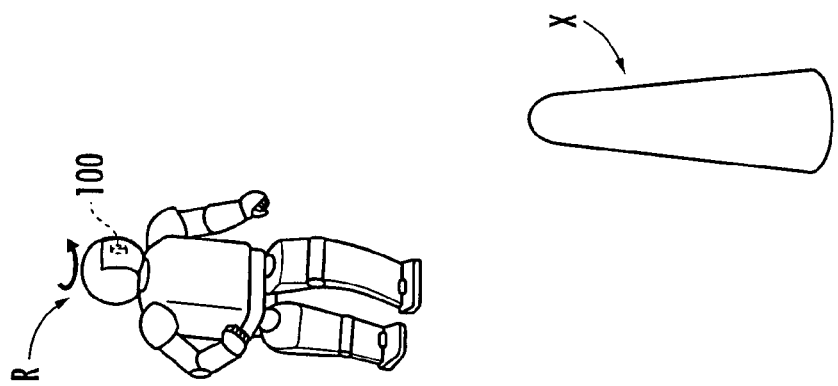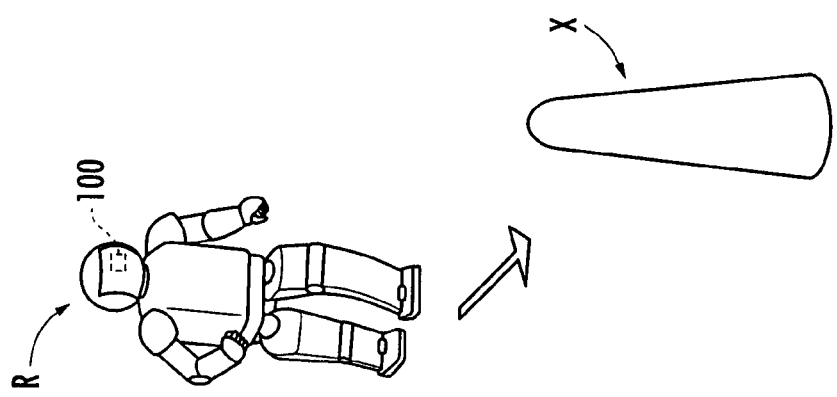

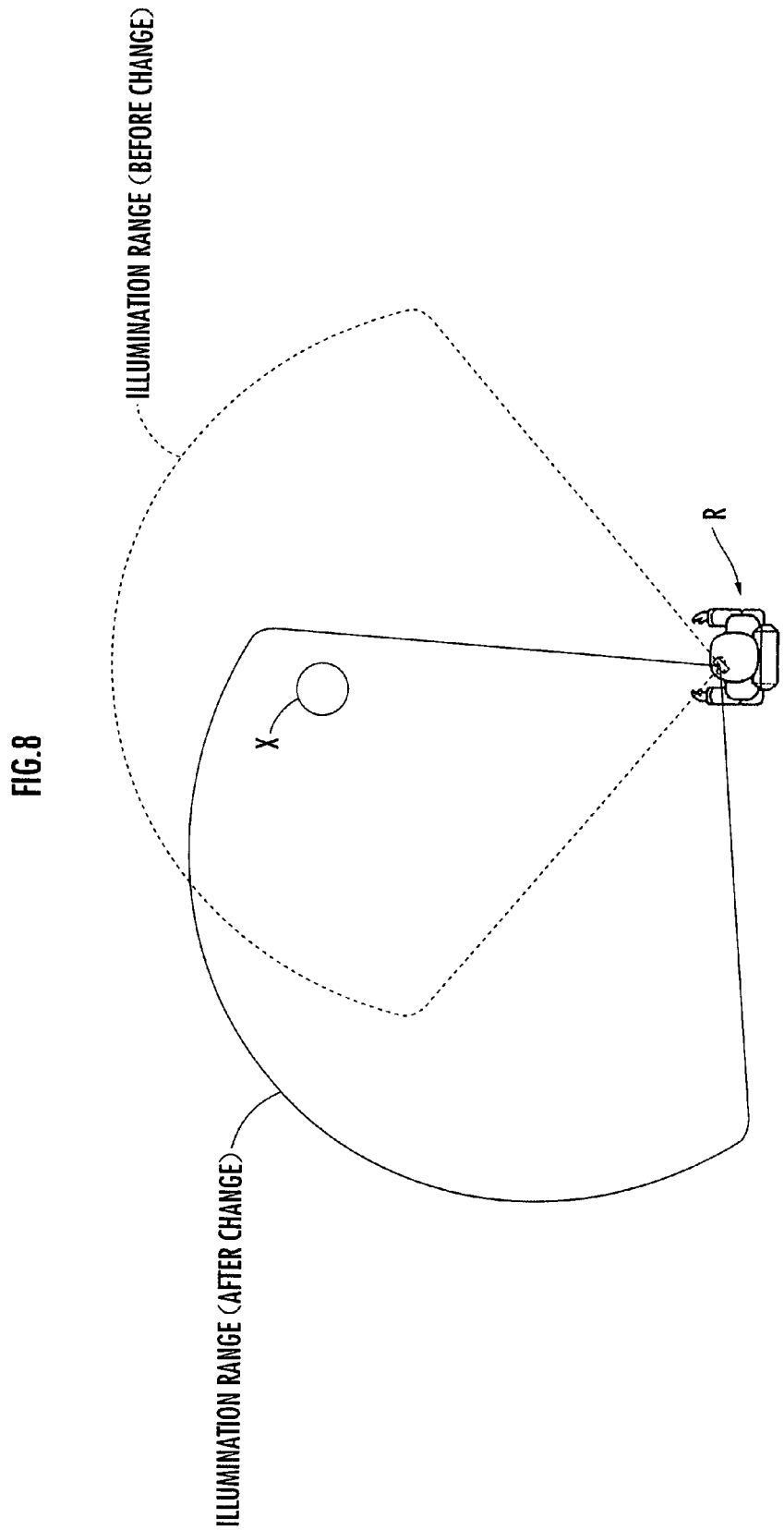

OPTICAL DEVICE AND MOBILE APPARATUS

BACKGROUND OF THE INVENTION

1. Field of the Invention

The present invention relates to an optical device and a mobile apparatus mounted with the optical device.

2. Description of the Related Art

An optical device has been proposed which measures a distance to an object based on a phase difference between the light projected onto the object and the light reflected from the object (see, for example, Japanese Patent Laid-Open No. 2004-257935). Conventionally, in order to detect an object or measure a distance thereto over a wide range, a cylindrical lens is arranged in front of a projector, and the curvature of the lens is increased to achieve light projection over the wide range. As the light source, a laser light source such as a laser diode is used for measurement of distance with high accuracy. Further, a screen has been proposed which can provide a viewer with wider and brighter video images by making the images pass through a lenticular lens.

The increase in curvature of the cylindrical lens, however, would lead to an increase in thickness of the lens, which hinders reduction in size of the optical device.

SUMMARY OF THE INVENTION

In view of the foregoing, an object of the present invention is to provide an optical device that ensures light projection over a wide range and reduction in size, and a mobile apparatus mounted with the optical device.

To achieve the above-described object, an optical device according to a first aspect of the invention is an optical device including a light-projecting unit and a light-receiving unit, wherein the light-projecting unit has a projector and a lenticular sheet arranged adjacently in layers, a first cylindrical lens array being formed on one surface of the lenticular sheet, and a second cylindrical lens array having a generatrix orthogonal to a generatrix of the first cylindrical lens array being formed on the other surface of the lenticular sheet, wherein the light-receiving unit has a light-receiver, and wherein the light-projecting unit and the light-receiving unit are arranged adjacent to each other in an integrated manner so that the light-receiver may sense light projected from the projector via the lenticular sheet and then reflected from an object.

According to the optical device of the first aspect of the invention, the first cylindrical lens array formed on one surface of the lenticular sheet serves to diffuse the projected light in the direction orthogonal to its generatrix. Similarly, the second cylindrical lens array formed on the other surface of the lenticular sheet diffuses the projected light in the direction orthogonal to its generatrix. Since the generatrices of the first and second cylindrical lens arrays are orthogonal to each other, the lenticular sheet ensures diffusion of the projected light over a range extending in two directions orthogonal to each other (for example, up and down direction and left and right direction). In the case where laser light is projected by the projector as well, the laser light is dispersed over a wide range, which prevents uneven distribution of the power. The light flux output from the laser diode is of a small cone shape, which means that the light cannot be illuminated over a wide range if there is a large light loss. The use of the lenticular lens sheet, suffering only a small light loss, ensures illumination of the light over the wide range.

The lenticular sheet also has a characteristic that it can disperse light irrespective of its distance from the projector. Taking advantage of this characteristic, the light-projecting unit is formed by arranging the projector and the lenticular sheet adjacently in layers, which ensures reduction in size of the optical device in the light projection direction. Further, the light-projecting unit is arranged adjacent to the light-receiving unit in an integrated manner, which ensures overall size reduction of the optical device as well as improvement in handling such as facilitation of the maintenance job. Furthermore, it is unnecessary to provide a mechanism for rotating the projector to allow illumination of light over a wide range, which saves the space therefor and, thus, contributes to the reduction in size.

The optical device according to a second aspect of the invention is characterized in that, in the optical device of the first aspect of the invention, the light-projecting unit has a first circuit board having a light-projecting side controller mounted thereon, the projector, and the lenticular sheet arranged adjacently in layers, and the light-projecting side controller controls the projection of light by the projector.

According to the optical device of the second aspect of the invention, in addition to the fact that the projector and the lenticular sheet are arranged adjacently in layers as described above, the circuit board having the light-projecting side controller mounted thereon is also arranged adjacently in a layered manner, to constitute the light-projecting unit. This ensures reduction in size of the optical device provided with the light-projecting side controller and the first circuit board having the same mounted thereon.

Further, the optical device according to a third aspect of the invention is characterized in that, in the optical device of the first aspect of the invention, the light-receiving unit has a second circuit board having a light-receiving side controller mounted thereon and the light-receiver arranged adjacently in layers, and the light-receiving side controller recognizes presence of the object or measures position of the object based on the light sensed by the light-receiver.

Furthermore, the optical device according to a fourth aspect of the invention is characterized in that, in the optical device of the second aspect of the invention, the light-receiving unit has a second circuit board having a light-receiving side controller mounted thereon and the light-receiver arranged adjacently in layers, and the light-receiving side controller recognizes presence of the object or measures position of the object based on the light sensed by the light-receiver.

According to the optical device of the third or fourth aspect of the invention, the second circuit board having the light-receiving side controller mounted thereon and the light-receiver are arranged adjacently in layers to constitute the light-receiving unit. This ensures reduction in size of the optical device provided with the light-receiving side controller and the second circuit board having the same mounted thereon.

The optical device according to a fifth aspect of the invention is characterized in that, in the optical device of the fourth aspect of the invention, the light-receiving side controller measures the position of the object based on communication with the light-projecting side controller via a communication line.

According to the optical device of the fifth aspect of the invention, the distance between the light-projecting side controller and the light-receiving side controller is reduced as the light-projecting unit and the light-receiving unit are arranged adjacently as described above. Accordingly, the communication line connecting the light-projecting side controller and the light-receiving side controller is reduced in length, which restricts superimposition of noise on a signal on the communication line, and thus improves accuracy in recognition of the object or accuracy in measurement of the position of the object by the light-receiving side controller.

The optical device according to a sixth aspect of the invention is characterized in that, in the optical device of the first aspect of the invention, the light-receiver is directed in a first direction, and the light-projecting unit and the light-receiving unit are arranged adjacent to each other in an integrated manner in a second direction perpendicular to the first direction.

According to the optical device of the sixth aspect of the invention, the light-projecting unit and the light-receiving unit are arranged in such a manner that the light reception direction by the light-receiver is perpendicular to the direction in which the two units are arranged adjacent to each other, which ensures downsizing of the optical device.

To achieve the above-described object, a mobile apparatus according to a seventh aspect of the invention is a mobile apparatus having a mobile function and mounted with an optical device, the optical device including a light-projecting unit and a light-receiving unit, wherein the light-projecting unit has a first circuit board having a light-projecting side controller mounted thereon, a projector, and a lenticular sheet arranged adjacently in layers, the light-projecting side controller controlling projection of light by the projector, a first cylindrical lens array being formed on one surface of the lenticular sheet, and a second cylindrical lens array having a generatrix orthogonal to a generatrix of the first cylindrical lens array being formed on the other surface of the lenticular sheet, wherein the light-receiving unit has a second circuit board having a light-receiving side controller mounted thereon, and a light-receiver arranged adjacently in layers, the light-receiving side controller recognizing presence of an object or measuring position of the object based on light sensed by the light-receiver, and wherein the light-projecting unit and the light-receiving unit are arranged adjacent to each other in an integrated manner so that the light-receiver may sense light projected from the projector via the lenticular sheet and then reflected from the object.

According to the mobile apparatus of the seventh aspect of the invention, it is possible to cause the optical device mounted thereon (the optical device of the fifth aspect of the invention) to illuminate light over a wide range in front of or in the direction of movement of the mobile apparatus. This enables the light-receiving side controller of the optical device to determine presence/absence of an object over a wide range, or measure the position of the object or its distance from the mobile apparatus. Furthermore, the behavior of the mobile apparatus can be controlled appropriately, from the standpoint of avoiding contact with the object or the like, based on the determination result or the measured distance. For example, it is possible to avoid the undesirable event that a change in course of the mobile apparatus for preventing contact with an object would cause contact with another object. Further, the light-projecting unit and the light-receiving unit are arranged adjacent to each other in an integrated manner for the purpose of downsizing the optical device. This ensures mobility as well as freedom in operation of the mobile apparatus, and also secures wiring space for the optical device and mounting space for other instruments in the mobile apparatus.

The mobile apparatus according to an eighth aspect of the invention is characterized in that, in the mobile apparatus of the seventh aspect of the invention, the mobile apparatus serves as a first mobile apparatus mounted with the optical device as a first optical device, and moves in a space where a second mobile apparatus mounted with the optical device as a second optical device exists, and wherein the light-receiving side controller of the first optical device recognizes a period during which emission of light by the projector of the second optical device is stopped, and recognizes the presence of the object or measures the position of the object based on the light sensed by the light-receiver of the first optical device during the relevant period.

Further, the mobile apparatus according to a ninth aspect of the invention is characterized in that, in the mobile apparatus of the eighth aspect of the invention, it includes a control system for controlling orientation of the light-receiver of the first optical device so as to be out of a light illumination range of the projector of the second optical device.

According to the mobile apparatus of the eighth and ninth aspects of the invention, it is possible to avoid the undesirable event of the light-receiver of the first optical device mounted on the mobile apparatus (first mobile apparatus) sensing the light emitted from the projector of the second optical device mounted on another mobile apparatus (second mobile apparatus). This prevents degradation of measurement accuracy of the position of the object by the light-receiving side controller of the first optical device due to the light emitted from the projector of the second optical device. Accordingly, the behavior of the first mobile apparatus can be controlled appropriately for the purposes of preventing contact with the object or the like, based on the measurement result of the position of the object by the light-receiving side controller of the first optical device.

The mobile apparatus according to a tenth aspect of the invention is characterized in that, in the mobile apparatus of the eighth aspect of the invention, the light-projecting side controller of the first optical device recognizes a period during which the light-receiver of the second optical device senses light, and causes the projector of the first optical device to emit light during a period other than the relevant period.

Further, the mobile apparatus according to an eleventh aspect of the invention is characterized in that, in the mobile apparatus of the eighth aspect of the invention, it includes a control system for recognizing a range in which light emitted from the projector of the first optical device is sensed by the light-receiver of the second optical device and for controlling orientation of the projector so as to prevent the light from being illuminated onto the relevant range by the projector.

According to the mobile apparatus of the tenth and eleventh aspects of the invention, it is possible to avoid the undesirable event of the light emitted from the projector of the first optical device mounted on the mobile apparatus (first mobile apparatus) being sensed by the light-receiver of the second optical device mounted on another mobile apparatus (second mobile apparatus). This prevents degradation of measurement accuracy of the position of the object by the light-receiving side controller of the second optical device due to the light emitted from the projector of the first optical device. Accordingly, the behavior of the second mobile apparatus can be controlled appropriately for the purposes of preventing contact with the object or the like, based on the measurement result of the position of the object by the light-receiving side controller of the second optical device.

The mobile apparatus according to a twelfth aspect of the invention is characterized in that, in the mobile apparatus of the seventh aspect of the invention, it is configured as a legged mobile robot having the optical device mounted on a head and capable of moving with a plurality of legs.

According to the mobile apparatus of the twelfth aspect of the invention, or, the legged mobile robot, as the optical device is mounted on the head located above the legs and other parts of the robot, it is possible to determine presence/absence of an object over a wide range from a relatively high vantage point. Further, since the optical device mounted on the head of the robot is reduced in size, it is possible to secure sufficient wiring space for the optical device and mounting space for other instruments in the head. Furthermore, with the downsizing of the head, the weight of the head is reduced as well, which can lower the center of gravity of the robot, thus facilitating stabilization in posture of the robot while it walks or runs with the operations of the legs. Still further, the reduction in weight of the head can avoid the undesirable event of the posture of the robot becoming unstable (wobbling) due to movement of the head when the head is movable with respect to the body (trunk of the body). That is, it is possible to change the light projection range by moving the head of the robot mounted with the optical device, while stabilizing the posture of the robot. Further, it is possible to allow the robot to walk or run appropriately, from the standpoint of avoiding contact with an object or the like, in accordance with the measured position of the object within the light projection range.

The mobile apparatus according to a thirteenth aspect of the invention is characterized in that, in the mobile apparatus of the seventh aspect of the invention, it is configured as a vehicle having the projector and the light-receiver of the optical device directed in its traveling direction.

According to the mobile apparatus of the thirteenth aspect of the invention, or, the vehicle, the optical device can be mounted on the vehicle by effectively using the limited space in the vehicle in which a large number of electronic instruments are mounted.

BRIEF DESCRIPTION OF THE DRAWINGS

FIGS. 6-8 illustrate functions of the optical device and the robot of the present invention.

DESCRIPTION OF THE PREFERRED EMBODIMENTS

Embodiments of the optical device and the mobile apparatus of the present invention will now be described with reference to the drawings. Firstly, configurations of the optical device and the mobile apparatus mounted with the optical device will be described.

Figure 1:
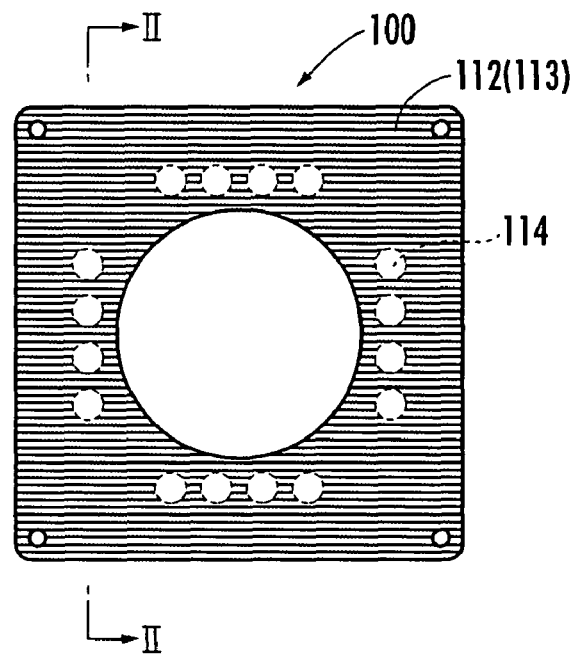
FIG. 1 shows a configuration example of an optical device according to the present invention.
Figure 2:
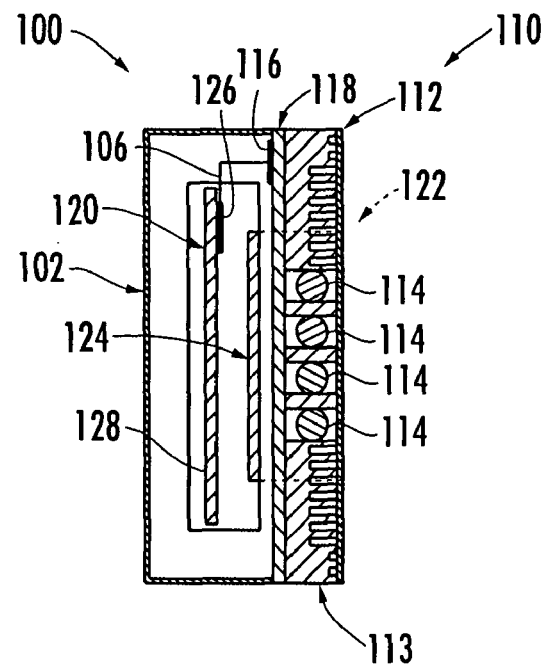
FIG. 2 is a cross-sectional view of the optical device shown in FIG. 1.

The optical device 100 shown in FIGS. 1 and 2 is provided with a housing 102, a light-projecting unit 110, and a light-receiving unit 120.

The light-projecting unit 110 includes a lenticular sheet 112, projectors (light sources) 114 each arranged inside an opening provided at a heat sink 113, and a circuit board 118 having a light-projecting side controller 116 mounted thereon, all of which are successively arranged in layers, adjacent to each other. The lenticular sheet 112, the heat sink 113 and the circuit board 118 are each of an approximately rectangular shape, and secured integrally with bolts penetrating through the four corners and nuts screwed onto the bolts.

Figure 3:
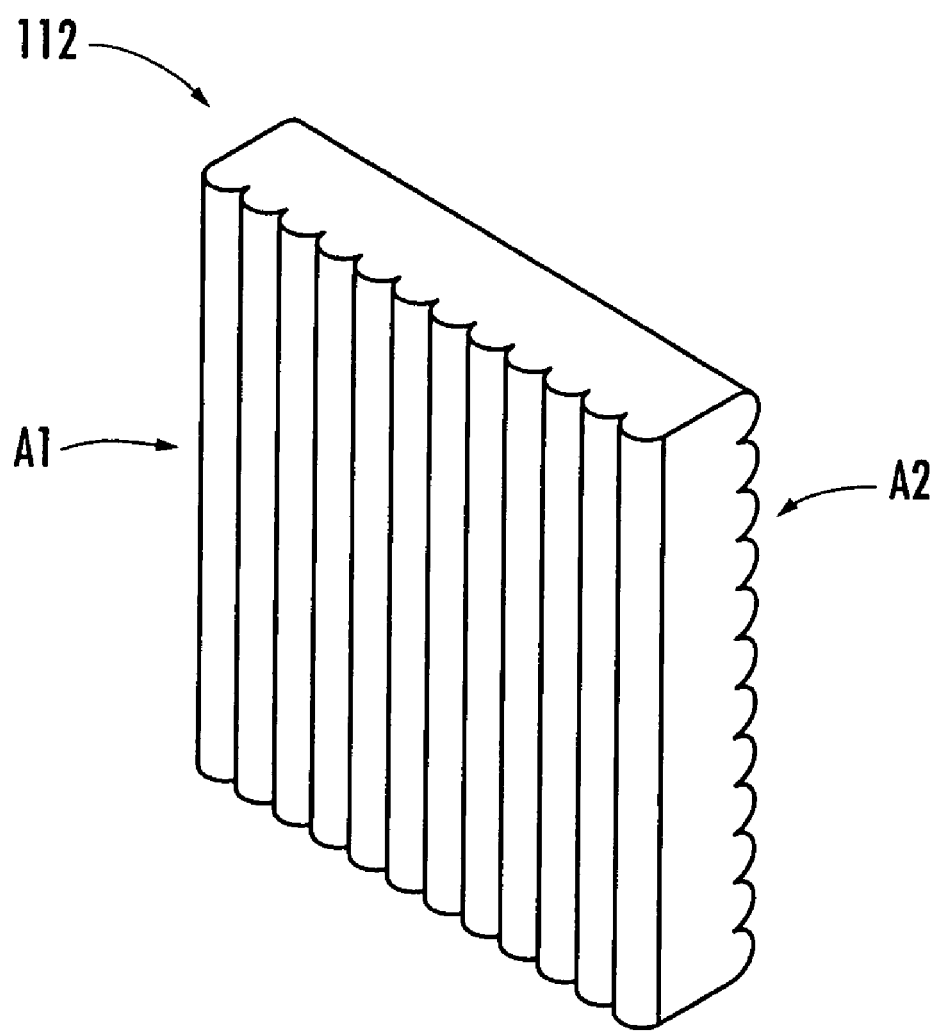
FIG. 3 shows a configuration example of a lenticular sheet.

As shown in FIG. 3, the lenticular sheet 112 has a first cylindrical lens array A1 formed on its one surface and a second cylindrical lens array A2 formed on its other surface, the second cylindrical lens array A2 having a generatrix orthogonal to the generatrix of the first cylindrical lens array A1. The lenticular sheet 112 is of a rectangular plate shape and provided with a circular hole at the central portion, as shown in FIG. 1, and constitutes a front wall of the housing 102, as shown in FIG. 2. It is noted that the lenticular sheet 112 may be formed with one sheet, or may be formed with two sheets each having a cylindrical lens array formed only on one surface and stacked one on the other. Further, a light-shielding member may be provided between the two sheets constituting the lenticular sheet 112. The heat sink 113 has a plurality of linear grooves extending in a prescribed direction. The projectors 114 are arranged to surround the central hole of the lenticular sheet 112, as shown in FIG. 1. The light-projecting side controller 116 is formed with CPU, ROM, RAM, I/O and others, and controls the electrical power supplied from a power source (not shown) to each projector 114, to thereby control the intensity of the light emitted from the projector 114.

The light-receiving unit 120 includes a light-receiving lens 122, a light-receiver 124, and a circuit board 128 having a light-receiving side controller 126 mounted thereon, all of which are successively arranged in layers, adjacent to each other. The light-receiving lens 122 is arranged so as to be seen through the hole provided at the center of the lenticular sheet 112, as shown in FIG. 1. The light-receiving side controller 126 is formed with CPU, ROM, RAM, I/O and others, and connected to the light-projecting side controller 116 via a communication line 106. The light-receiving side controller 126 measures a phase difference between the light emitted from each projector 114 and the light (reflected light from the object) received by each pixel of the light-receiver 124, through communication with the light-projecting side controller 116, and measures the position of the object or the distance to the object based on the phase difference. The distance measurement method using the phase difference is described in Japanese Patent Laid-Open No. 2004-257935 described above and the like, and thus, detailed description thereof will not be provided here.

The light-projecting unit 110 and the light-receiving unit 120 are arranged adjacent to each other in an integrated manner so that the light-receiver 124 can sense the light emitted from the projector 114 via the lenticular sheet 112 and then reflected from the object. The light-receiver 124 is directed in a first direction (corresponding to the right direction in FIG. 2), and the light-projecting unit 110 and the light-receiving unit 120 are arranged adjacent to each other in an integrated manner in a second direction perpendicular to the first direction.

Figure 4:
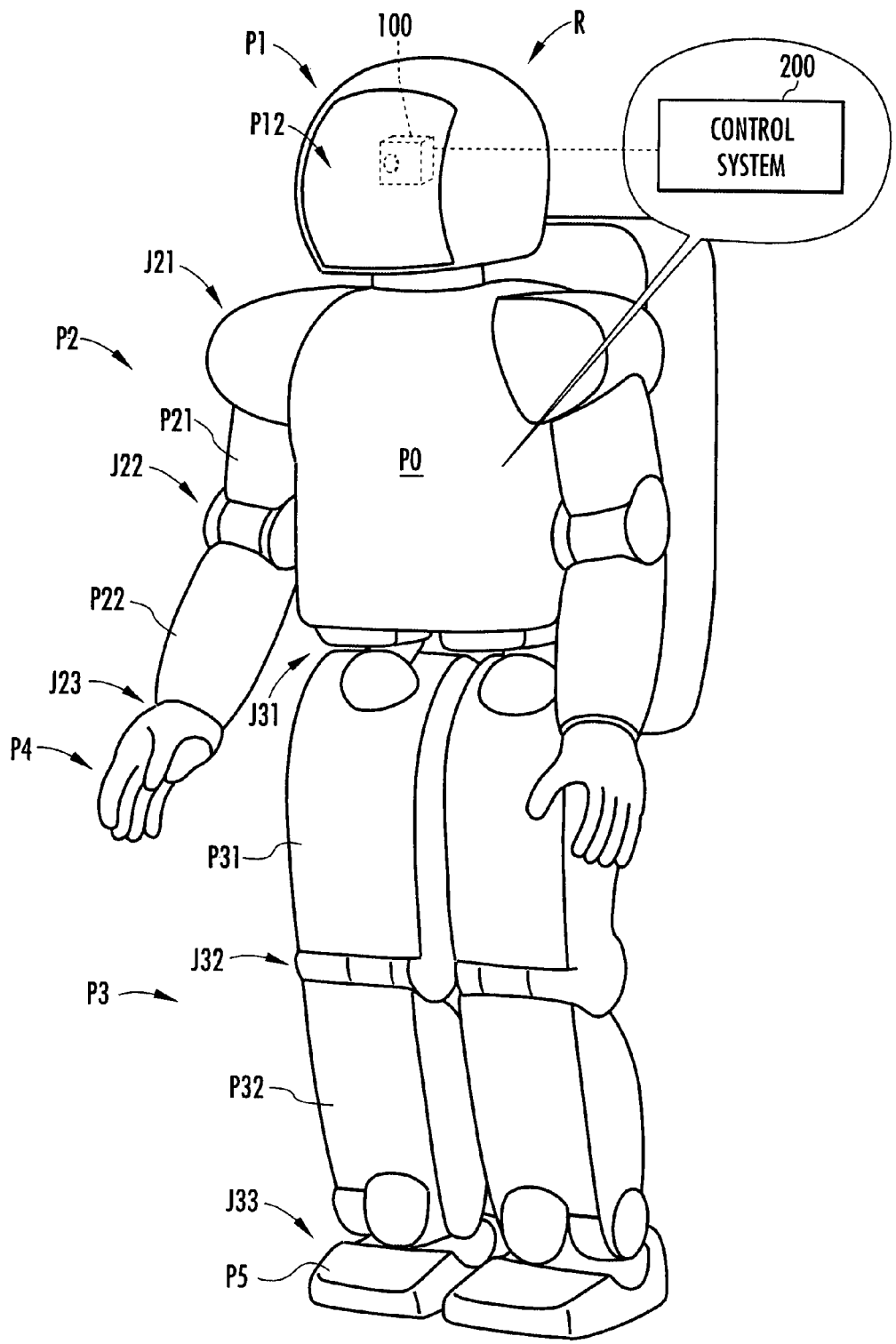
FIG. 4 shows a configuration example of a robot mounted with the optical device according to the present invention.

The optical device 100 shown in FIGS. 1 and 2 is mounted on a legged mobile robot (mobile apparatus) R shown in FIG. 4. The robot R includes, similarly to a human being, a body P0, a head P1 provided on top of the body P0, left and right arms P2 extended from the respective sides of an upper part of the body P0, hands P4 provided respectively at ends of the left and right arms P2, left and right legs P3 extended downward from a lower part of the body P0, feet P5 provided respectively at ends of the left and right legs P3, and a control system 200 controlling the operation of the robot R. The optical device 100 is mounted on the head P1. The robot R is capable of moving at each joint, as an actuator (electric motor) 202 is supplied with electric power from a battery and activated, and its power is transmitted to a link via a power-transmitting mechanism formed with wire, pulley, reduction gear and the like.

The body P0 has the upper and lower parts joined above and below in a manner allowing relative rotation about a yaw axis. The head P1 is capable of moving in various ways, including rotation about the yaw axis with respect to the body P0. The head P1 is provided with a cover P12 that protects the optical device 100 and other instruments mounted on the head P1. The cover P12 has transparency with respect to the light emitted from the projector 114 and sensed by the light-receiver 124. The cover P12 makes the internal structure of the head P1 barely visible from the outside, in order to avoid loss of affinity (characteristics that prevent the surrounding humans from feeling uncomfortable) of the robot R.

Each arm P2 has a first arm link P21 and a second arm link P22. The body P0 and the first arm link P21 are joined via a shoulder joint J21, the first arm link P21 and the second arm link P22 are joined via an elbow joint J22, and the second arm link P22 and the hand P4 are joined via a carpal joint J23. The shoulder joint J21 has rotational degrees of freedom about the roll, pitch and yaw axes, the elbow joint J22 has a rotational degree of freedom about the pitch axis, and the carpal joint J23 has rotational degrees of freedom about the roll, pitch and yaw axes.

Each leg P3 has a first leg link P31 and a second leg link P32. The body P0 and the first leg link P31 are joined via a hip joint J31, the first leg link P31 and the second leg link P32 are joined via a knee joint J32, and the second leg link P32 and the foot P5 are joined via an ankle joint J33. The hip joint J31 has rotational degrees of freedom about the roll, pitch and yaw axes, the knee joint J32 has a rotational degree of freedom about the pitch axis, and the ankle joint J33 has rotational degrees of freedom about the roll and pitch axes.

Figure 5:
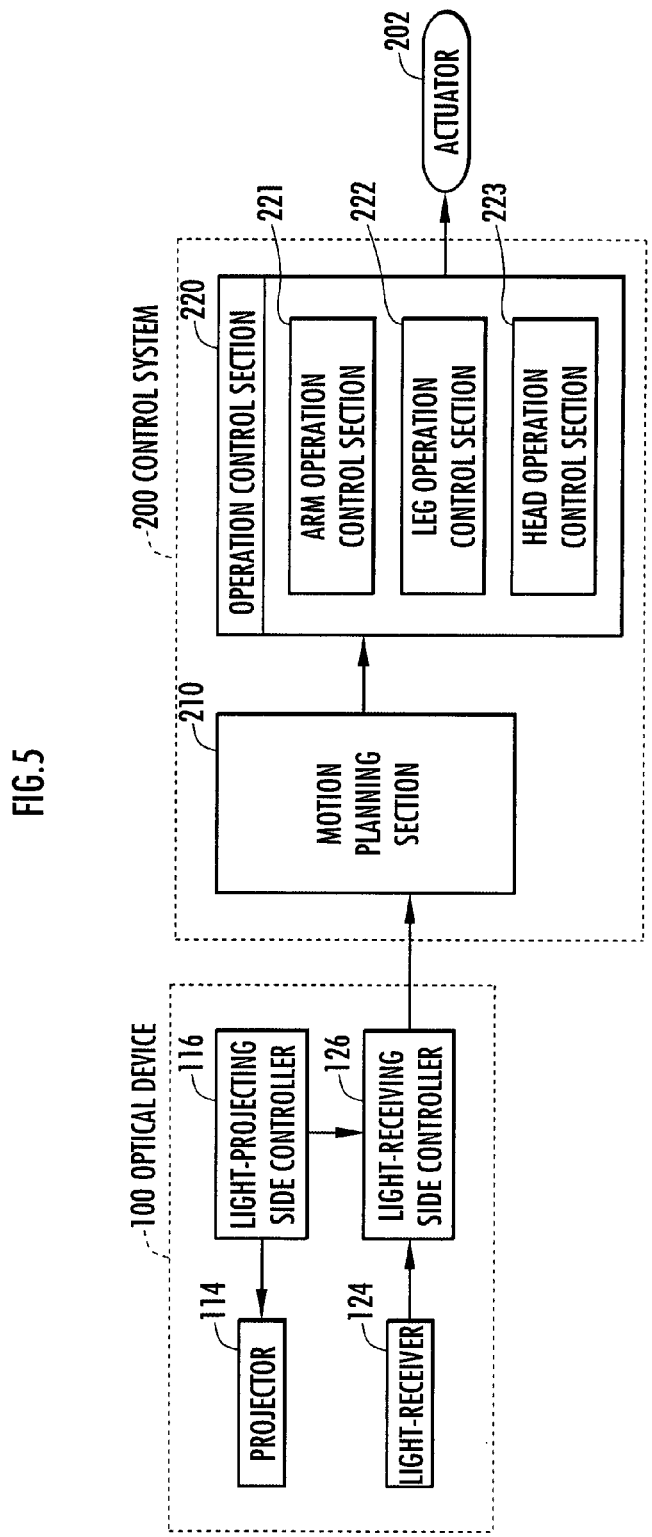
FIG. 5 shows a configuration example of the robot mounted with the optical device according to the present invention.

The control system 200 of the robot R is formed with a computer (including CPU, ROM, RAM, I/O and others), and has a motion planning section 210 and an operation control section 220, as shown in FIG. 5.

The motion planning section 210 sets appropriate operations (motion planning) for preventing the robot R from contacting an object, based on the position of the object with respect to the robot R measured as described above by the light-receiving side controller 126 of the optical device 100.

The operation control section 220 has an arm operation control section 221, a leg operation control section 222, and a head operation control section 223. The arm operation control section 221 controls the operations of the arms P2 by controlling the operation of the actuator 202 that applies power to the first arm links P21 and the second arm links P22, according to the motion planning set by the motion planning section 210. The leg operation control section 222 controls the operations of the legs P3 by controlling the operation of the actuator 202 that applies power to the first leg links P31 and the second leg links P32, according to the motion planning set by the motion planning section 210. The head operation control section 223 controls the operation of the head P1 by controlling the operation of the actuator 202 that applies power to the head P1, according to the motion planning set by the motion planning section 210.

The functions of the optical device 100 and the robot R having the above-described configurations will now be described.

Figure 6:
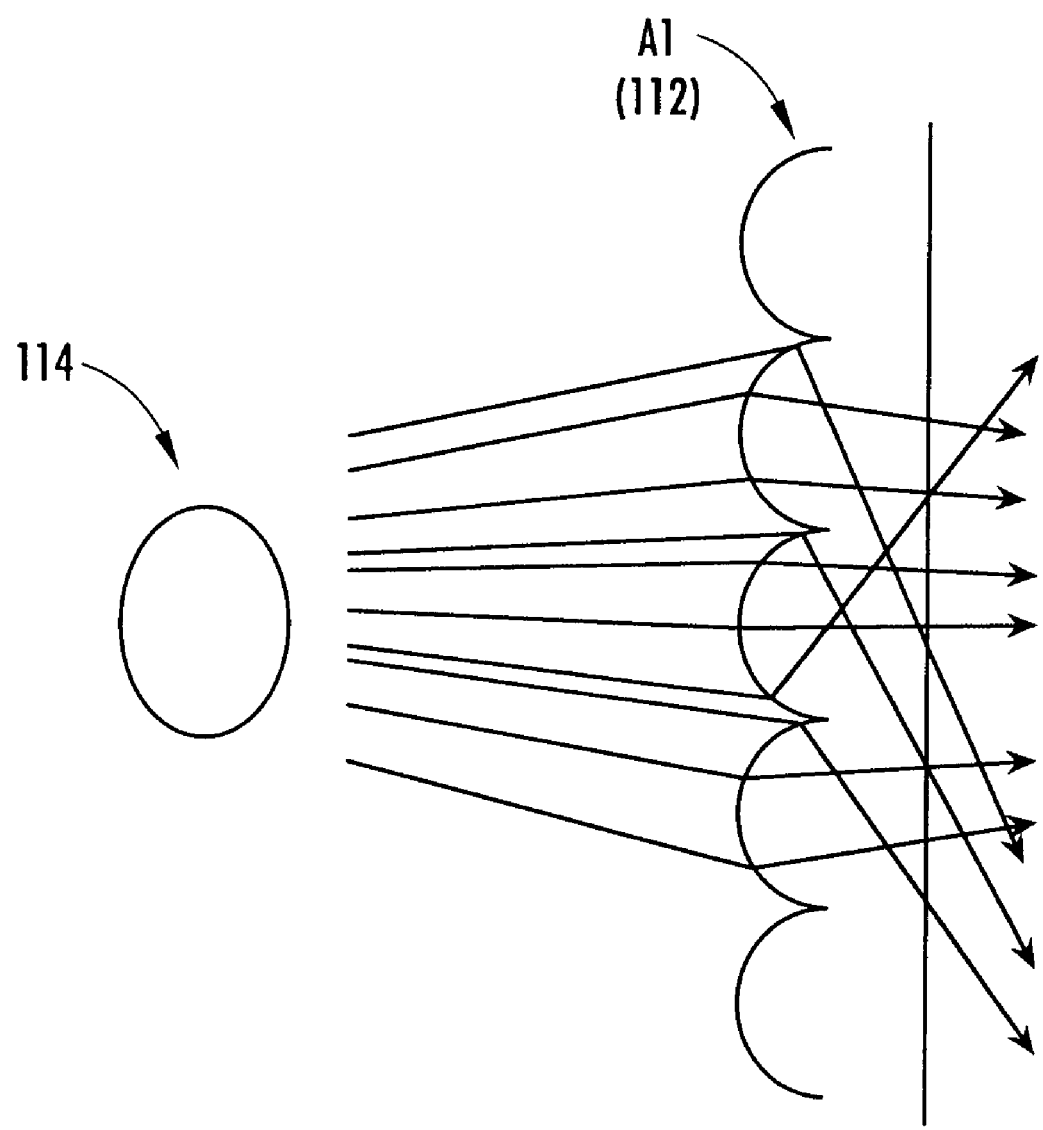

According to the optical device 100, as shown in FIG. 6, the light emitted from the projector 114 is diffused by the first cylindrical lens array A1 formed on a surface of the lenticular sheet 112, in the direction orthogonal to its generatrix. The light is diffused similarly by the second cylindrical lens array A2 formed on the other surface of the lenticular sheet 112, in the direction orthogonal to its generatrix. Since the generatrices of the first and second cylindrical lens arrays A1 and A2 are orthogonal to each other, the lenticular sheet 112 can make the light illuminated in front of the robot R, in the range extending in the up and down and left and right directions. In the case where laser light is emitted from the projector 114 as well, the laser light is dispersed over the wide range to prevent uneven distribution of the power.

Further, the lenticular sheet 112 has a characteristic that it can disperse the light irrespective of the distance to the projector 114. Taking advantage of this characteristic, the projector 114 and the lenticular sheet 112 are arranged in layers in close vicinity, to constitute the light-projecting unit 110 (see FIG. 2). In addition to the projector 114 and the lenticular sheet 112 arranged in layers adjacently, the circuit board 118 having the light-projecting side controller 116 mounted thereon is arranged in a layered manner as well, to constitute the light-projecting unit 110 (also see FIG. 2). This ensures downsizing of the optical device 100 in the light projection direction.

Furthermore, a plurality of projectors 114 are arranged adjacent to the light-receiver 124 in an integrated manner, which ensures overall downsizing of the optical device 100 and improvement in handling such as facilitation of the maintenance job (see FIGS. 1-3).

The circuit board 128 having the light-receiving side controller 126 mounted thereon, the light-receiver 124, and the light-receiving lens 122 are arranged in layers adjacent to each other, to constitute the light-receiving unit 120 (see FIG. 2). This, together with the light-projecting unit 110 arranged adjacent to the light-receiving unit 120, ensures downsizing of the optical device 100. It is noted that the projector 114 and the light-receiver 124 have their optical axes aligned with each other, and accordingly, the phase difference, which becomes the basis of measurement of the position of the object x, will not include a difference attributable to relative inclination between the optical axes of the projector 114 and the light-receiver 124.

Furthermore, as the light-projecting unit 110 and the light-receiving unit 120 are arranged adjacent to each other, the distance between the light-projecting side controller 116, mounted on the circuit board 118 constituting the light-projecting unit 110, and the light-receiving side controller 126, mounted on the circuit board 128 constituting the light-receiving unit 120, can be reduced. This leads to shortening of the communication line 106 connecting the light-projecting side controller 116 and the light-receiving side controller 126, which can prevent superimposition of noise on the signal on the communication line 106, and thus improve the accuracy in measurement of the position of the object.

Consider, for example, the case where there is an object (obstacle) x in front of the moving robot R, as shown in FIG. 7(a). In this state, the light projection range of the optical device 100 extends horizontally left and right in front of the robot R, as shown by a broken line in FIG. 8. The light projection range extends also in the up and down direction in front of the robot R. In other words, as the optical device 100 is mounted on the head P1 located above the legs P3 and other parts constituting the robot R, it is possible to determine presence/absence of an object over a wide range in the up and down direction from a relatively high vantage point. In this state, the light-receiving side controller 126 of the optical device 100 determines that there is an object x within the light projection range, and measures the position approximately at the center of the light projection range as the position of the object x.

The motion planning section 210 plans the motion to rotate the head P1 to the left, in accordance with the determination result and the measurement result. Specifically, since there is a possibility that the robot R may contact the object x according to the results of determination and measurement of the light-receiving side controller 126, the motion to avoid such contact is looked for. Further, according to the motion planning, the head operation control section 223 turns the head P1 of the robot R to the left, as shown in FIG. 7(b). As such, the light projection range of the optical device 100 is moved to the left, as shown by a solid line in FIG. 8, from the previous light projection range (broken line). The light-receiving side controller 126 of the optical device 100 then determines that only the object x exists in the light projection range, and measures the position near the right end of the light projection range as the position of the object x.

According to the determination result and the measurement result, the motion planning section 210 plans the motion that the robot R moves while changing the direction of movement to the left. This is because it can be determined, according to the results of determination and measurement of the light-receiving side controller 126, that the contact with the object x will be prevented and there will be no contact with another object if the direction of movement is changed to the left. With this motion planning, mainly the leg operation control section 222 controls the operations of the legs P3, so that the robot R moves while changing the direction of movement to the left, as shown in FIG. 7(c).

With the downsizing of the head P1, its weight is reduced as well, which can maintain or lower the center of gravity of the robot R, thus facilitating stabilization in posture of the robot R while it walks or runs with the operations of the legs P3. Furthermore, the reduction in weight of the head P1 can avoid the undesirable event of the posture of the robot R becoming unstable (wobbling) due to movement of the head P1. That is, it is possible to change the light projection range by moving the head P1 of the robot R mounted with the optical device 100, while stabilizing the posture of the robot R (see FIG. 8). Further, from the standpoint of avoiding contact with the object x or the like, it is possible to allow the robot R to walk or run appropriately in accordance with the measurement result of the position of the object x within the light projection range (see FIGS. 7(a), 7(b) and 7(c)).

Further, since the optical device 100 mounted on the head P1 of the robot R is reduced in size as described above, it is possible to secure sufficient wiring space for the optical device 100 and mounting space for other instruments in the head P1.

In the embodiment described above, the optical device 1 is mounted on the head P1 of the robot R. In another embodiment, it may be mounted on the body P0 or other portions of the robot R.

Figure 9:
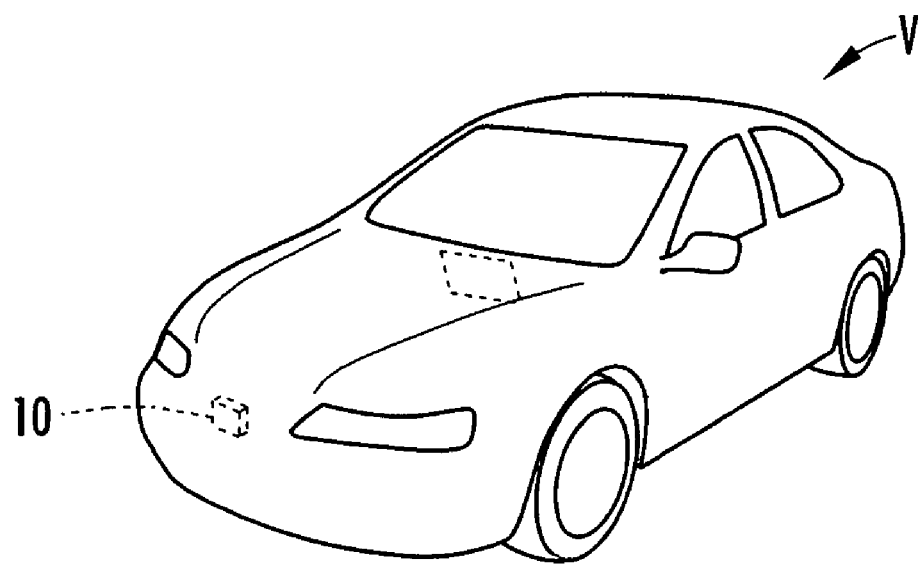
FIG. 9 shows another configuration example of the optical device and the mobile apparatus according to the present invention.

Further, as shown in FIG. 9, the optical device 100 may be mounted on a vehicle V such that the projector 114 and the light-receiver 124 face the front of the vehicle V (traveling direction of the vehicle V). With this configuration, the behavior of the vehicle V can be controlled appropriately based on the result of determination about presence/absence of an object over a wide range or on the measured position of the object with respect to the vehicle V. Further, since the optical device 100 is reduced in size as described above, the space for mounting other instruments can be secured in the vehicle V.

In the embodiment described above, a plurality of projectors 114 are arranged to surround the light-receiving unit 120. In another embodiment, the number of the projectors 114 and their arrangement with respect to the light-receiving unit 120 (or the light-receiver 124) may be changed as appropriate; for example, one or more projectors 114 may be arranged in close proximity to the light-receiving unit 120.

There may be a case where a first mobile apparatus such as a robot R mounted with the optical device (first optical device) 100 moves in a space in which there exists a second mobile apparatus such as another robot R similarly mounted with the optical device (second optical device) 100.

In this case, through communication between the first mobile apparatus and the second mobile apparatus for example, the light-receiving side controller 126 of the first optical device may recognize the period during which emission of light by the projector 114 of the second optical device is stopped, and measure the position of the object x based on the light sensed by the light-receiver 124 of the first optical device during the relevant period. Further, the control system 200 of the first mobile apparatus may recognize light illumination range by the projector 114 of the second optical device, through communication with the control system 200 of the second mobile apparatus, and operate the actuator 202 to control the orientation of the head P1 and, hence, the orientation of the light-receiver 124 of the first optical device, so that it is out of the relevant light illumination range.

According to the mobile apparatus configured as described above, it is possible to avoid the undesirable event of the light-receiver 124 of the first optical device, mounted on the mobile apparatus (first mobile apparatus), sensing the light emitted from the projector 114 of the second optical device, mounted on the other mobile apparatus (second mobile apparatus). This prevents degradation of measurement accuracy of the position of the object x by the light-receiving side controller 126 of the first optical device due to the light emitted from the projector 114 of the second optical device. Accordingly, the behavior of the first mobile apparatus can be controlled appropriately, from the standpoint of preventing contact with the object, based on the measurement result of the position of the object x by the light-receiving side controller 126 of the first optical device (see FIGS. 7(a) to 7(c)).

Further, in the above-described case, the light-projecting side controller 116 of the first optical device may recognize the period during which the light-receiver 124 of the second optical device senses the light, through communication between the first mobile apparatus and the second mobile apparatus for example, and cause the projector 114 of the first optical device to emit light during a period other than the relevant period. Furthermore, the control system 200 of the first mobile apparatus may recognize the range in which the light emitted from the projector 114 of the first optical device is sensed by the light-receiver 124 of the second optical device, through communication with the control system 200 of the second mobile apparatus for example, and control the operation of the actuator 202 to control the orientation of the head P1 and, hence, the orientation of the projector 114, to prevent the projector 114 from illuminating light onto the relevant range.

According to the mobile apparatus configured as described above, it is possible to avoid the undesirable event that the light emitted from the projector 114 of the first optical device mounted on the mobile apparatus (first mobile apparatus) is sensed by the light-receiver 124 of the second optical device mounted on the other mobile apparatus (second mobile apparatus). This prevents degradation of measurement accuracy of the position of the object x by the light-receiving side controller 126 of the second optical device due to the light projected from the projector 114 of the first optical device. Accordingly, the behavior of the second mobile apparatus can be controlled appropriately, from the standpoint of avoiding contact with the object x or the like, based on the measurement result of the position of the object x by the light-receiving side controller 126 of the second optical device (see FIGS. 7(a) to 7(c)).

In the embodiment described above, one optical device 100 is mounted on a mobile apparatus, as shown in FIG. 4 or 9. In another embodiment, a plurality of optical devices 100 may be mounted on a mobile apparatus. This makes it possible, upon deterioration of the function of one optical device 100, to use another optical device 100 instead.

Figure 10:
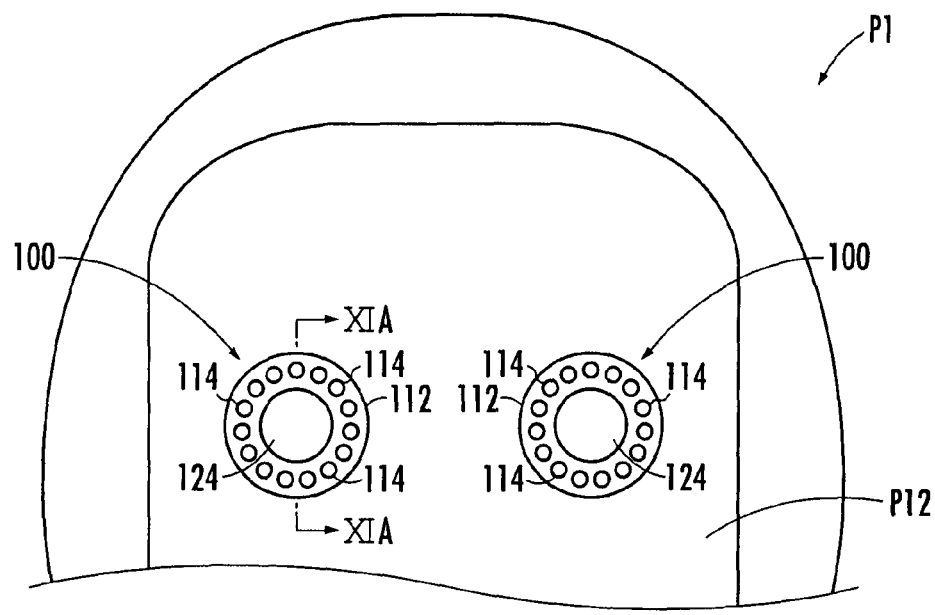
FIG. 10 shows configuration examples of the optical devices of the present invention and mounting examples to the mobile apparatus.
Figure 10:
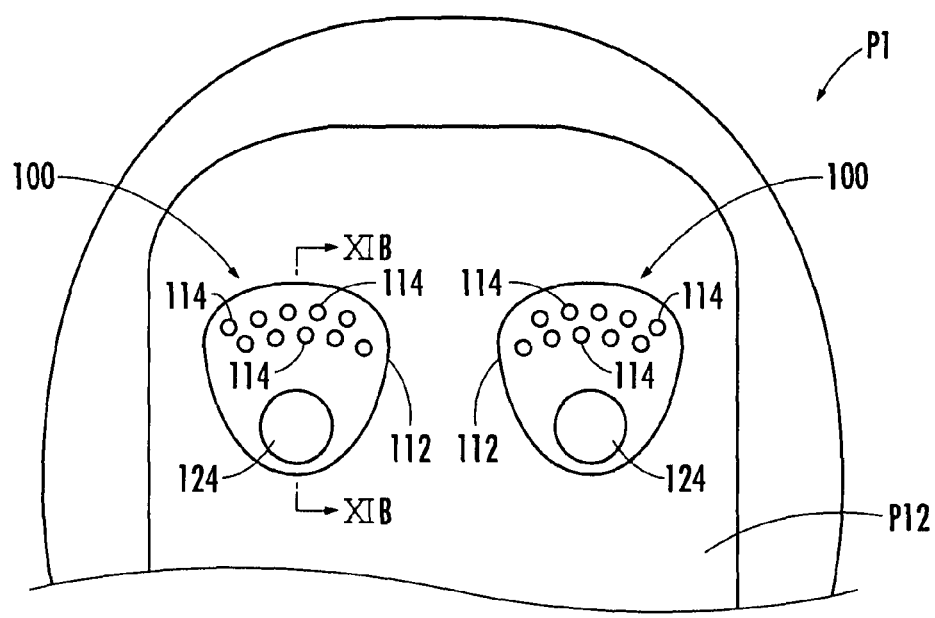
Figure 11:
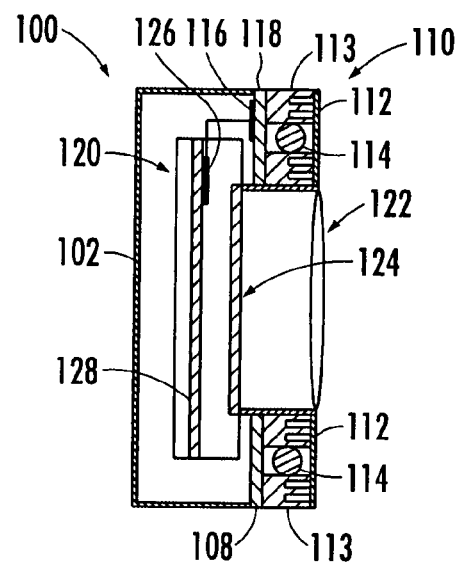
FIG. 11 shows cross-sectional views of the optical devices shown in FIG. 10.
Figure 11:
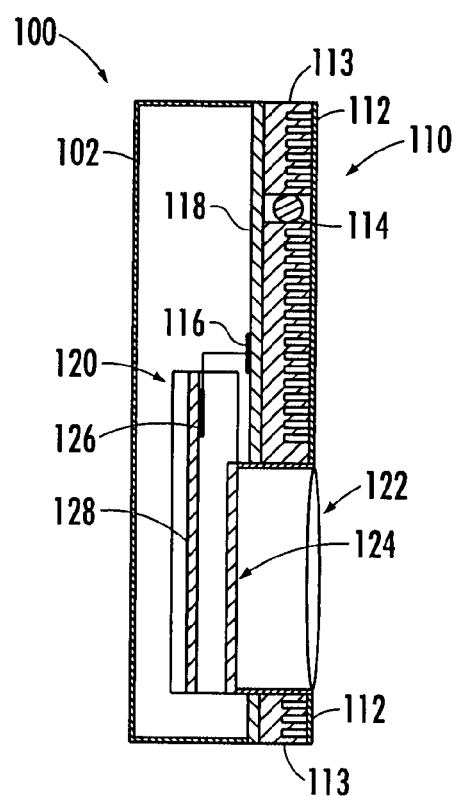

For example, a pair of optical devices 100 may be arranged in the head P1 of the robot R side by side in the lateral direction as seen from the front of the robot R, as shown in FIGS. 10(a) and 10(b). According to the optical devices 100 shown in FIGS. 10(a) and 11(a), each lenticular sheet 112 is formed in a ring shape, the light-receiver 124 is arranged at its center, and a plurality of projectors 114 are arranged annularly along the shape of the lenticular sheet 112 to surround the light-receiver 124. According to the optical devices 100 shown in FIGS. 10(b) and 11(b), each light-receiver 124 is arranged at an opening located at the lower part of the corresponding lenticular sheet 112, and a plurality of projectors 114 are arranged in two horizontal rows at the upper part of the lenticular sheet 112.

The pair of optical devices 100 arranged in these manners are seen through the cover P12 like the left and right eyes of the human being, which allows the humans around the robot R to feel affinity of the robot R in the space where the humans exist. Further, as visible light is emitted from each projector 114, the plurality of projectors 114 look like the outlines of the human eyes according to the robot R shown in FIG. 10(a), while according to the robot R shown in FIG. 10(b), the light-receivers 124 look like the pupils of the human eyes and the plurality of projectors 114 look like the eyebrows. This allows the humans around the robot R to feel the affinity of the robot R to the environment more strongly.

What is claimed is:

1. An optical device comprising a light-projecting unit and a light-receiving unit, wherein
   the light-projecting unit has a projector and a lenticular sheet arranged adjacent to each other, a first cylindrical lens array being formed on one surface of the lenticular sheet, and a second cylindrical lens array having a generatrix orthogonal to a generatrix of the first cylindrical lens array being formed on the other surface of the lenticular sheet, wherein the projector is arranged in a heat sink of the light-projecting unit,
   the light-receiving unit has a light-receiver, and
   the light-projecting unit and the light-receiving unit are arranged adjacent to each other in an integrated manner so that the light-receiver may sense light projected from the projector via the lenticular sheet and reflected from an object.

2. The optical device according to claim 1, wherein the light-projecting unit has a first circuit board having a light-projecting side controller mounted thereon, the projector, and the lenticular sheet arranged adjacent to each other, and the light-projecting side controller controls the projection of light by the projector.

3. The optical device according to claim 1, wherein the light-receiving unit has a second circuit board having a light-receiving side controller mounted thereon and the light-receiver arranged adjacent to each other, and the light-receiving side controller recognizes presence of the object or measures position of the object based on the light sensed by the light-receiver.

4. The optical device according to claim 2, wherein the light-receiving unit has a second circuit board having a light-receiving side controller mounted thereon and the light-receiver arranged adjacent to each other, and the light-receiving side controller recognizes presence of the object or measures position of the object based on the light sensed by the light-receiver.

5. The optical device according to claim 4, wherein the light-receiving side controller measures the position of the object based on communication with the light-projecting side controller via a communication line.

6. The optical device according to claim 1, wherein the light-receiver is directed in a first direction, and the light-projecting unit and the light-receiving unit are arranged adjacent to each other in an integrated manner in a second direction perpendicular to the first direction.

7. A mobile apparatus having a mobile function and mounted with an optical device,
   the optical device comprising a light-projecting unit and a light-receiving unit, wherein
   the light-projecting unit has a first circuit board having a light-projecting side controller mounted thereon, a projector, and a lenticular sheet arranged adjacent to each other, the light-projecting side controller controlling projection of light by the projector, a first cylindrical lens array being formed on one surface of the lenticular sheet, and a second cylindrical lens array having a generatrix orthogonal to a generatrix of the first cylindrical lens array being formed on the other surface of the lenticular sheet, wherein the projector is arranged in a heat sink of the light-projecting unit,
   the light-receiving unit has a second circuit board having a light-receiving side controller mounted thereon, and a light-receiver arranged adjacent to each other, the light-receiving side controller recognizing presence of an object or measuring position of the object based on light sensed by the light-receiver, and
   the light-projecting unit and the light-receiving unit are arranged adjacent to each other in an integrated manner so that the light-receiver may sense light projected from the projector via the lenticular sheet and reflected from the object.

8. The mobile apparatus according to claim 7, wherein
   the mobile apparatus serves as a first mobile apparatus mounted with the optical device as a first optical device, and moves in a space where a second mobile apparatus mounted with the optical device as a second optical device exists, and
   the light-receiving side controller of the first optical device recognizes a period during which emission of light by the projector of the second optical device is stopped, and recognizes the presence of the object or measures the position of the object based on the light sensed by the light-receiver of the first optical device during the relevant period.

9. The mobile apparatus according to claim 8, comprising a control system for controlling orientation of the light-receiver of the first optical device so as to be out of a light illumination range of the projector of the second optical device.

10. The mobile apparatus according to claim 8, wherein the light-projecting side controller of the first optical device recognizes a period during which the light-receiver of the second optical device senses light, and causes the projector of the first optical device to emit light during a period other than the relevant period.

11. The mobile apparatus according to claim 8, comprising a control system for recognizing a range in which light emitted from the projector of the first optical device is sensed by the light-receiver of the second optical device and for controlling orientation of the projector so as to prevent the light from being illuminated onto the relevant range by the projector.

12. The mobile apparatus according to claim 7, configured as a legged mobile robot having the optical device mounted on a head and capable of moving with a plurality of legs.

13. The mobile apparatus according to claim 7, configured as a vehicle having the projector and the light-receiver of the optical device directed in a traveling direction.

* * * * *